United States Patent Office 3,159,038
Patented Dec. 1, 1964

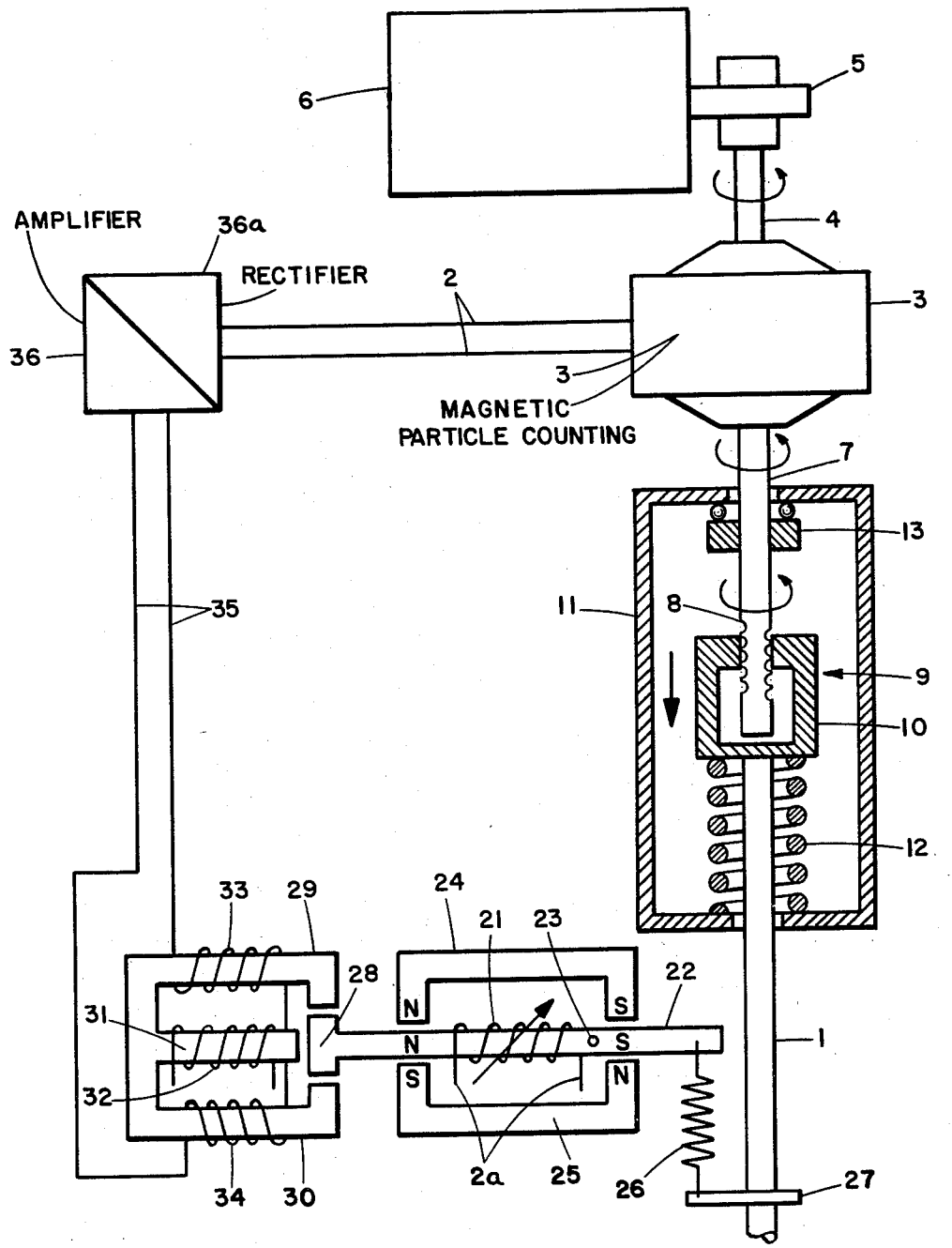

3,159,038
ACTUATORS FOR POSITIONING A CONTROL VALVE OR OTHER MEMBER IN ACCORDANCE WITH AN ELECTRICAL SIGNAL
Kenneth John Brown, Oxted, England, assignor to The Foxboro Company, Foxboro, Mass., a corporation of Massachusetts
Filed Nov. 20, 1961, Ser. No. 153,566
1 Claim. (Cl. 74—1)

This invention relates to actuators for controlling the positions of members in accordance with electrical signals; that is to say, electrical-mechanical transducers. The invention is particularly concerned with members, such as valves, which are arranged to move to-and-fro between extreme positions and are to be controlled to take up any selected positions in the range defined by such extreme positions, the control being effected either at will or by an electrical control apparatus. The invention can, however, readily be adapted to apparatus in which the controlled member is arranged to undergo continuous cyclic movement under the control of a continuously varying signal.

One object of the invention is to provide actuator devices in which the motive power is derived from a simple, convention, easily-replaceable, constant speed, unidirectional electric motor, the mechanical disadvantages and maintenance difficulties necessitated by reversing motors, and by their associated switch gear, being avoided.

Another object of the invention is to provide an actuator arranged to control an oscillating or reciprocating member without the complication of backlash, and therefore without the attendant non-linear characteristics that are introduced by backlash. However, in certain applications of the invention, the non-linear characteristics introduced by friction are liable to become apparent, and it is yet a further object of the invention to provide means whereby the effects of friction are, from a practical point of view, eliminated.

According to the invention, an actuator includes an electrically controlled coupling capable of transmitting a first torque that varies in accordance with a variable electrical signal delivered to the coupling, means for connecting the input element of the coupling to constantly rotating driving means, resilient means arranged to apply a second torque to the output element of the coupling so as to oppose the first torque transmitted by the coupling and so that the stress in the resilient means depends on the signal fed to the coupling, and a controlled member, the position of which depends on the stress in the resilient means, while the output element of the coupling rotates in the same direction as the input element, is stationary, or in the reverse direction according to the relationship between the magnitudes of the two torques.

The coupling is preferably one that depends on an electromagnetic effect, as in a magnetic particle coupling, such that the first torque is a function of the magnitude of an electric current supplied to the coupling and constituting the signal.

As the output torque of a magnetic particle coupling bears a linear relationship with the control current supplied to the coupling, and as the strain in a spring bears a linear relationship with the stress therein, it is convenient to arrange a compression or a spiral or a torsion spring to serve as the resilient means in such a way that the output torque of the magnetic particle coupling may be balanced at any point within a predetermined range, and consequently in such a way that the positon of the controlled member, which may be a fluid control valve, varies directly as the control current. It will be appreciated that the output torque of a magnetic particle coupling, having an input element rotating at a constant speed and torque, is independent of the absolute speed of the output element and of the speed of the output element relatively to the input element. Therefore, for a given ouput torque; that is to say, for a given control current, the output shaft may, as aforesaid, be rotating in either direction or stationary. This property greatly facilitates the choice of connection between the output element on the one hand and the spring, together with the controller member, on the other hand. Where the controlled member is mounted for straight line reciprocating motion in sympthy with the to-and-fro arcuate movements of the output element of the coupling, the connection may take the form of a re-circulating ball nut transmitter, a simple screw, a simple lever arm, or a high efficiency, spur type gear box. In each case the connection is reversible; that is to say, the spring loaded controlled member can react on the output element of the magnetic particle coupling to cause the shaft to stop or reverse when the output torque of the coupling falls sufficiently low relatively to the torque exerted by the spring.

While linear systems have been primarily considered above, it has, as already pointed out, been realised that friction introduces non-linear conditions. It is, therefore, very advantageous, in certain applications of the invention, to arrange the signal current supplied to the magnetic particle coupling to be a function not only of the control current but also of the position of the valve, or other controlled member, itself. For this purpose, the position of a pivoted control armature may be determined according to opposed forces due respectively to an electromagnetic effect of a control current and to a resilient connection between the armature and the controlled member, the armature being arranged to control an error signal supplied by a differential transformer to an amplifier and rectifier supplying the coupling.

In order that the invention may be clearly understood, and readily carried into effect, apparatus in accordance therewith will now be described, by way of example, with reference to the diagrammatic drawing accompanying the specification, in which:

The drawing is a schematic illustration of an embodiment of this invention.

Referring to the drawing, the actuator is arranged to control the position of a controlled member, in the form of an axially reciprocable valve spindle 1, in accordance with a variable direct current signal through leads 2 to a magnetic particle coupling 3. During the operation of the actuator, the input element, constituted by a shaft 4, of the coupling is driven at constant speed and torque through reduction gearing 5 by a constant speed, unidirectional electric motor 6. The output element, constituted by a shaft 7, of the coupling is coaxial with the input shaft 4. The coupling is of the type having opposed rotors with an interposed mixture of iron particles and oil subjected to a magnetic field dependent on the current supply, the rotors being fixed respectively to the input and output shafts. The output torque exerted by the shaft 7 is known to bear a linear relationship to the magnitude of the signal current through the leads 2 and is independent of its absolute speed and of its speed relatively to the input shaft 4. A minimum input torque is necessary before any output torque is apparent.

The free end of the output shaft 7 is formed with a helical groove 8 and constitutes the inner element of a recirculating ball nut transmitter 9, the outer element or nut 10 of which is fixed coaxially to the spindle 1. The transmitter 9 is located in a fixed casing 11 and resilient means, in the form of a helical compression spring 12, are interposed and compressed between the casing 11 and the nut 10. The valve spindle 1 passes with clearance through a hole in the casing 11 and axial movement of the shaft 7 under the thrust of the spring 12 is limited by ball thrust bearings between a race 13, fixed to the shaft 7, and the casing 11. This eliminates undesirable axial thrust in the magnetic particle coupling. The valve spindle 1 can move freely to-and-fro through a hole in the casing 11, but the spindle 1 and the nut 10 are prevented from rotation about their common axis by splines (not shown).

The recirculating ball nut transmitter 9 is known in itself, and the helical groove 8 on the shaft 7 as well as the helical groove in the nut 10 have semi-circular cross-sections with a series of steel balls arranged to run along these opposed grooves and to recirculate through an external channel (not shown). Thus, the sliding friction between the thread surfaces of an ordinary screw and nut is replaced by rolling friction and the mechanical efficiency may be of the order of 90%. The result of this is that the action may be reversed; that is to say, not only can rotation of one member produce axial movement in the other member, but also axial movement of one member can produce rotation in the other member.

In operation, if it is desired to cause the valve spindle 1 to move outwards from the casing 11 by a predetermined amount, the signal current through the leads 2 is increased by a corresponding amount, thereby reducing the slip between the input and output shafts of the magnetic particle coupling 3. The torque exerted by the output shaft 7, is, therefore, increased and the nut 10 is forced axially against the action of the spring 12. The resisting force of the spring 12 increases directly as its length diminishes and therefore there is a resisting torque on the shaft 7 that increases linearly as the spring is compressed. When the resisting torque increases to a value such that it equals the output torque of the magnetic particle coupling 3, the movement ceases with the valve in the position corresponding to the current supplied to the magnetic particle coupling 3.

Now supposing it is desired to move the valve in the opposite direction so that the valve spindle 1 moves inwards with respect to the casing 11, the signal current through the leads 2 is reduced so that the spring 12 becomes predominant forcing the nut 10 towards the coupling 3. The nut 10, therefore, forces the shaft 7 to rotate in a direction opposite to the direction in which the magnetic particle coupling 3 tends to cause the shaft 7 to rotate, until the spring 12 has relaxed sufficiently for the two torques on the shaft 7 to balance one another, whereupon a new state of equilibrium is reached.

The magnetic particle coupling 3 may be replaced by a coupling, known in itself, in which the signal current through the leads 2 is supplied to the winding of an electromagnetic stator in the centre of which an iron armature is rotated by the input shaft 4. An aluminum cup, mounted coaxially on the output shaft 7, is arranged with its rim in the air gap between the iron armature and the stator, so that eddy currents are induced in the cup and a torque is applied to the output shaft 7 which varies nearly linearly with the value of the current supplied to the stator.

The compression spring 12 may be replaced by a spiral spring that acts directly on the output shaft 7, the centre of the spring being fixed to the shaft 7 and its outer end to the casing 11. In this case, the recirculating ball nut transmitter 9 can be replaced by a simple screw connection. Thus, when the torque transmitted through the magnetic particle coupling 3, or like coupling, increases, the spiral spring is wound up while the valve spindle 1 is moved outwards by the screw. When the torque due to the coupling decreases, the wound spiral spring overcomes that torque, so that the output shaft 7 turns in a direction such as to feed the valve spindle 1 inwards.

It will be appreciated that the signal current supplied to the magnetic particle coupling may be derived from electrical control apparatus intended to maintain constant liquid flow through pipework in which the valve is inserted. In such circumstances the movement of the valve may be continuous, or nearly continuous, or, at least fairly frequent. In these circumstances, and in cases where rapid valve movements are required, friction can play an important part, in that it turns the action from one that obeys a linear law to one that is non-linear. It is then desirable to arrange the signal current to the magnetic particle coupling to be a function not only of the control current but also of the actual position of the valve.

It will be seen that the control current is supplied through leads 2a to a coil 21 on an armature, in the form of an iron bar 22, mounted to move to and fro about a fixed point 23. This bar is mounted between the pole pieces of two permanent magnets 24, 25. The polarities are as shown and, in view of the fact that the pivot 23 is asymmetrically disposed with respect to the magnetic poles, an increase in the current through the coil 21 causes the bar 22 to turn counter-clockwise and a decrease in current causes clockwise movement. Such movements, however, are made under the influence of a second resilient means, in the form of a helical tension spring 26, interposed between the bar 22 and a member 27 fixed to the valve spindle 1. At its end remote from the spring 26, the bar 22 is provided with a pole piece 28 located between the outer limbs 29, 30 of a transformer having a centre limb 31 carrying a primary winding 32 supplied constantly with alternating current. Opposed secondary windings 33, 34 on the limbs 29, 30 are connected by leads 35 to an amplifier 36, which includes a rectifier 36a, the rectifier output being supplied through leads 2 to the magnetic particle coupling 3.

When this apparatus is in equilibrium, the torque applied to the bar 22 by the spring 26 sensibly equals the torque due to the interaction with the fields of the permanent magnets 24, 25 of the field due to the coil 21. Then the pole piece 28 is nearly symmetrically disposed between the limbs 29, 30 of the transformer, which serves as a null detector. The small asymmetry which exists applies a small error signal to the input of the amplifier and the direct current output from the rectifier, in passing through the magnetizing windings of the magnetic particle coupling, sets up a torque sufficient to maintain equilibrium.

A small change in the position of the valve spindle 1 or in the value of the control current passing through the winding 21 produces an unbalanced condition that causes the pole piece 28 to move to a limiting position in one direction or the other about the pivot 23, thereby altering the linkage between the primary winding 32 and secondary windings 33, 34 of the transformer. These limiting positions may be determined by stops. Such a movement to a limiting position causes a comparatively large change in the error signal through the leads 35 and a correspondingly large change in the output torque of the magnetic particle coupling. Thus, in the case of friction which has a comparatively high starting value and decreases as the movement proceeds, an increase in the control current through the leads 2a and coil 21, causing the bar 22 to turn counterclockwise, produces a ready response in the downward movement of the valve spindle 1. This, however, increases the tension in the spring 26, which returns the pole piece 28 nearly to its symmetrical position. Similarly a reduction in the control current causes a clockwise movement of the bar 22, and a ready upward movement of the valve spindle 1, thus increasing the relaxation of the spring 26 and again returning the pole piece 28 nearly to its symmetrical position.

I claim:

A device for controlling the position of a positionable member, comprising, in combination, a one direction constant speed, constant torque driven member, a magnetic particle coupling to which said driven member is applied as input, electrical signal input means to said coupling for controlling the operation thereof, an output member from said coupling driven from said input driven member according to the coupling effect due to said electrical signal, a positionable member positionable by said output member in predetermined relation to said input signal, means biasing the positionable member against the output member, and mechanical-electrical transducing means connected mechanically from said positionable member and electrically into said electrical signal input means as a controlling factor in the electrical signal input to said magnetic particle coupling, whereby the actual position of said positionable member is a factor in the control input.

References Cited by the Examiner

UNITED STATES PATENTS

| | | | |
|---|---|---|---|
| 2,629,552 | 2/53 | Dickey | 192—21.5 X |
| 2,644,427 | 7/53 | Sedgfield | 251—131 |
| 2,661,825 | 12/53 | Winslow | 192—21.5 |
| 2,745,507 | 5/56 | Bodine. | |
| 2,806,533 | 9/57 | Fleck. | |
| 2,824,460 | 2/58 | Davis | 192—21.5 X |
| 2,855,950 | 10/58 | Phillips | 251—137 X |
| 2,911,843 | 11/59 | Mitchell | 74—388 X |

BROUGHTON G. DURHAM, *Primary Examiner.*